United States Patent
Itoh (10) Patent No.: US 6,608,865 B1
(45) Date of Patent: Aug. 19, 2003

(54) CODING METHOD FOR VIDEO SIGNAL BASED ON THE CORRELATION BETWEEN THE EDGE DIRECTION AND THE DISTRIBUTION OF THE DCT COEFFICIENTS

(75) Inventor: Yuji Itoh, Tsukuba (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/947,575

(22) Filed: Oct. 9, 1997

(30) Foreign Application Priority Data

Oct. 9, 1996 (JP) .............................. 8-268877

(51) Int. Cl.$^7$ ................................. H04N 7/12
(52) U.S. Cl. ................................. 375/240.08
(58) Field of Search ................ 348/420, 384, 348/390, 403, 404, 421, 700, 701, 400, 405; 382/232, 243, 248, 250, 266–269, 199, 256; 375/240.08, 240.2; H04N 7/12

(56) References Cited

U.S. PATENT DOCUMENTS

| | | | | |
|---|---|---|---|---|
| 5,410,350 A | * | 4/1995 | Kato et al. ................... | 348/400 |
| 5,557,330 A | * | 9/1996 | Astle ........................... | 348/420 |
| 5,701,368 A | | 12/1997 | Jung | |
| 5,724,097 A | * | 3/1998 | Hibi et al. ................... | 348/405 |
| 5,878,161 A | * | 3/1999 | Ishida et al. ................ | 382/256 |
| 6,252,993 B1 | * | 6/2001 | Murayama .................. | 382/199 |

FOREIGN PATENT DOCUMENTS

| | | |
|---|---|---|
| CN | 1 131 873 A | 9/1996 |
| EP | 0 607 484 A | 7/1994 |

OTHER PUBLICATIONS

Kim J D: D Coding of edge blocks in digital video sequence coding Visual Communications and Image Processing '94, Chicago, IL. USA. Sep. 25–28, 1994, vol. 2308, pt. 3. pp. 1615–1626, XP002102940 ISSN 0277–786X, Proceedings of the SPIE—The International Society for Optical Engineering, 1994, USA * section 3 "ATBC for edge blocks in digital video coding" ** figures, 7,8.

Yo–sung Ho et al: "Classified Transform Coding of Images Using Vector Quantization" Multidimensional Signal Processing, Audio and Electroacoustics, Glasgow, May 23–26, 1989, vol. 3, No. Conf. 14. May 23, 1989, pp. 1890–1893, XP000089247 Institute of Electrical and Electronics Engineers * section 3 "Transform domain classification" ** figures 1,2 *.

Itoh Y: "An Edge–Oriented Progressive Image Coding" IEEE Transactions on Circuits and Systems for Video Technology, vol. 6, No. 2, Apr. 1, 1996, pp. 135–142, XP005383533 * section II "Hierarchical edge extraction" ** section III.D "Residual coding for smooth component" *.

(List continued on next page.)

*Primary Examiner*—Young Lee
(74) *Attorney, Agent, or Firm*—Robert D. Marshall, Jr.; W. James Brady, III; Frederick J. Telecky, Jr.

(57) ABSTRACT

The objective of the invention is to make high-efficiency compressed coding for images. In coding of video signals in this application example, the edge is extracted in a frame of the input image in block 10. In block 11, classification is made into blocks where edge is present and blocks free of edge. In block 12, for the block where edge is present, based on the correlation between the edge direction and the distribution of the DCT coefficients, the optimum scanning order is determined and coding is performed by the scanning order.

9 Claims, 5 Drawing Sheets

OTHER PUBLICATIONS

Lee J H et al: "An Efficient Encoding of DCT Blocks with Block–Adaptive Scanning" IEICE Transactions on Communications, vol. 77–B. No. 12, Dec. 1, 1994, pp. 1489–1494, XP000498064 * p. 1489, right–hand column, line 27–line 42  section 2 "Block adaptive scanning"  section 3 "Encoding algorithm" *.

Eisuke Nakasu et al: "Intra/Inter Mode Adaptive DCT Coding System of HDTV Signals" Signal Processing of HDTV, 3, Turin, Sep. 4–6, 1991, No. Workshop 4. Sep. 4, 1991. pp. 439–446. XP000379981 Yasuda H; Chiariglione L * sections 2.4 "Adaptive scanning and 2.5 Quantization"* * p. 443, line 14 line 15 * * figures 1–3.

* cited by examiner

DISTRIBUTION OF DCT COEFFICIENT

| BLOCK TYPE | CLASSIFICATION BLOCK |
|---|---|
| EDGE BLOCK | a0,a1,a2,b2,c1 |
| NONEDGE BLOCK | c1,c2 |
| MULTIEDGE BLOCK | b0,b1 |

CODING METHOD FOR VIDEO SIGNAL BASED ON THE CORRELATION BETWEEN THE EDGE DIRECTION AND THE DISTRIBUTION OF THE DCT COEFFICIENTS

FIELD OF THE INVENTION

This invention pertains to a processing technology of video signals. In particular, this invention pertains to a technology of compressed coding.

BACKGROUND OF THE INVENTION

The discrete cosine transform (DCT) is a means with high efficiency for:video signal compressed coding (N. Ahmed, et al.: [Discrete cosine transform] IEEE Trans. Comput., vol. C-23, pp. 90–93, 1974), and great efforts have been made to further increase the coding efficiency for the coding based on DCT. Consequently, it is necessary to perform adaptive processing for the transformation coefficient for the non-static property of the video signal.

In the adaptive DCT coding system, it is necessary to have the code adapted to the prescribed characteristics of the image block. The methods for realizing this include a variable block size method and adaptive quantization method. In the variable block size method, first of all, the image is decomposed to blocks having different sizes. The less fine region is represented by blocks with larger size. Then, the variable block size DCT is adapted. In this way, the bits of the less fine region can be reduced. Consequently, additional bits can be used for transmission of the highly fine region. Consequently, it is possible to improve the image quality by this method. On the other hand, the adaptive quantization method includes threshold coding and zonal coding. In the threshold coding, only the coefficient with its magnitude larger than a prescribed threshold is transmitted, and the transmitted coefficient's site and magnitude are coded. A typical method for coding such information is the run-level coding method adopted by JPEG and MPEG. On the other hand, in the zonal coding, only the coefficient present inside the prescribed region called the zone is coded. The shape of the zone has to be selected carefully as it significantly affects the coding efficiency. As a matter of fact, it is possible to code certain coefficients with a smaller magnitude, while to abandon the coefficients with a larger magnitude. This is because the shape of the zone is pre-scribed beforehand. This mechanism might be able to further improve the coding efficiency.

The aforementioned methods may be classified by means of the block classification method, which determines whether it is necessary to find out on the receiver side the class to which each block belongs, and whether it can be derived on the receiver side. When the size of the blocks is too small and the number of classes is too large, this overhead information can be transmitted directly without much penalty. However, in the other cases, other methods have to be used. For example, when 16 classes are used for the 8×8-pixel blocks, 4 bits are needed for each block. For SIF size image as one of the common formats of the image (352×240 pixel, 8 bits/pixel with respect to the brightness), suppose it has a chroma format of 4:2:0 and a compression ratio of 20:1, the total overhead information becomes 5280 bits, which is over 10% the compressed data. Sharing has to be adopted based on the coding gain for the overhead amount, that is, the information with the supporting role.

SUMMARY OF THE INVENTION

This invention provides an adaptive DCT coding based on the geometric edge display. In its algorithm, by means of the adaptive scanning, the zonal coding can be changed to a more compatible method, and it is possible to perform the variable block size method in a parallel manner. The geometric edge information including the site and direction of the edge can reduce the bits with respect to the information with the supporting role. On the other hand, it can replace the direct transfer of the block classification. This new algorithm can transfer the block classification information at a high efficiency, so that it might outdo the coding not of the adaptive type with respect to the performance.

In the coding method of this invention, there are the following steps: step in which the edge is extracted on one frame of the input image, step in which the aforementioned frame is classified into blocks where the aforementioned extraction edge is present and blocks where there is no said extraction edge, and a step in which for the aforementioned blocks with the aforementioned extraction edge present, based on the correlation between the edge direction and the distribution of the discrete cosine transform coefficient, the optimum scanning order is determined, and the scanning order is coded.

REFERENCE NUMERALS AS SHOWN IN THE DRAWINGS

10 is an edge extraction step, 11 a block classification step, 12 an adaptive DCT coding step, 13 a variable block size DCT step, 14 a quantization step, 15 a scanning order control step, and 16 a variable-length coding step.

DESCRIPTION OF THE EMBODIMENT

The following is a detailed description of the application example of this invention including the theoretical discussion.

Figure 1:
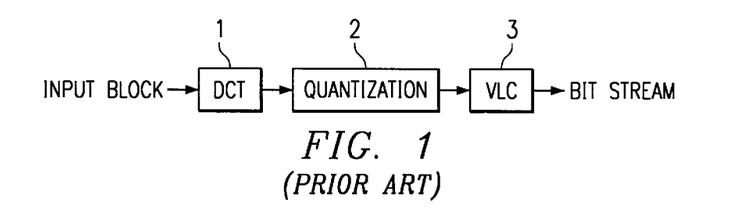
FIG. 1 is a block diagram illustrating a conventional adaptive DCT coding method.

FIG. 1 is a block diagram illustrating a typical conventional adaptive DCT coding method.

In the discrete cosine transform (DCT) performed in block 1, the block of pixel values is transformed to the matrix of the horizontal and vertical spatial frequency coefficients. The MXM 2-dimensional DCT is defined as follows.

[Formula 1]

$$F(u, v) = \frac{2}{M}C(u)C(v)\sum_{x=0}^{M-1}\sum_{y=0}^{M-1} f(x, y)\cos\frac{(2x+1)}{2M}u\pi \cdot \cos\frac{(2y+1)}{2M}v\pi \quad (1)$$

$$C(u), C(v) = \begin{cases} \frac{1}{\sqrt{2}} & \text{for } u, v = 0 \\ 1 & \text{otherwise} \end{cases}$$

where, u, v, x, y=0, 1, 2, . . . M−1; x and y represent the sample region's spatial coordinates; and u and v represent the coordinates of the transformation region.

The block of pixel values can be reproduced by performing inverse DCT (IDCT) with respect to the spatial frequency coefficient.

[Formula 2]

$$f(x, y) = \frac{2}{M}\sum_{u=0}^{M-1}\sum_{v=0}^{M-1} C(u)C(v)F(u, v)\cos\frac{(2x+1)}{2M}u\pi \cdot \cos\frac{(2y+1)}{2M}v\pi \quad (2)$$

Usually, most energy is concentrated in the low-frequency coefficient. The upper-left DCT coefficient in the block is called DC coefficient. This corresponds to the average pixel value of the block, and the other terms are called AC coefficients. In this case, the cases of 16×16 and 8×8-DCT, which are usually adopted by the image/video compression algorithm, are considered.

Usually, a natural image can be divided into regions of different sizes having fine portions of variable parameters and information. Division of the image to such segments is favorable for coding with a high efficiency of image data, particularly for the image compression by means of progressive transmission. Quad tree (QT) coding is the main scheme representing image decomposition, that is, multi-layer formation. In this case, the image is divided into 2-dimensional homogeneous square regions, and a tree is formed by decomposition. Each section of the tree has four elements, and it is related to the region defined uniquely for the image. The root is related to the entire image.

Figure 2:
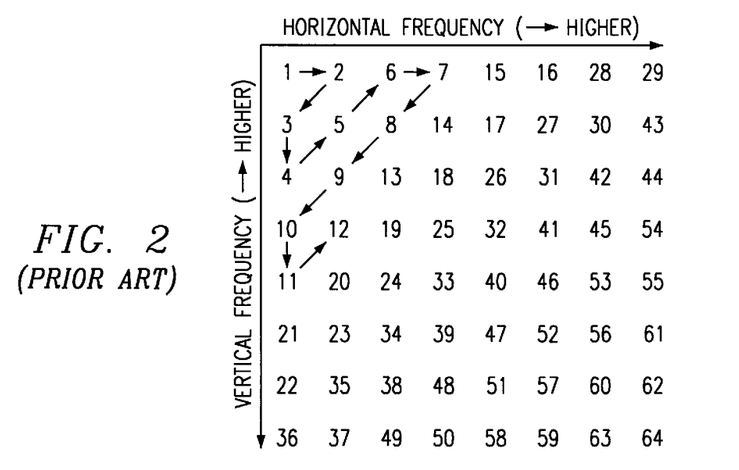
FIG. 2 is a diagram illustrating the zigzag scanning order.

Quantization performed in block 2 is performed with the range of the value represented by a value in the range. The size of the section of quantization is selected such that as long as the value of the coefficient is not above a prescribed quantization level, the human eye will not sense that the prescribed spatial frequency has been lost. In this way, it is favorable for generation of the AC coefficient of 0. The statistical coding of the predicted run of the coefficient with consecutive 0s of the higher-order coefficient is the reason for obtaining a reasonable compression gain. In the beginning of the series, the coefficients that are not 0 are summarized; after the last nonzero coefficient, the coefficient having as many 0s as possible is coded. For this purpose, the transformation coefficient is scanned in the rising order of the spatial frequency. FIG. 2 shows the so-called zigzag scanning order prescribed by JPEG and MPEG.

Figure 3:
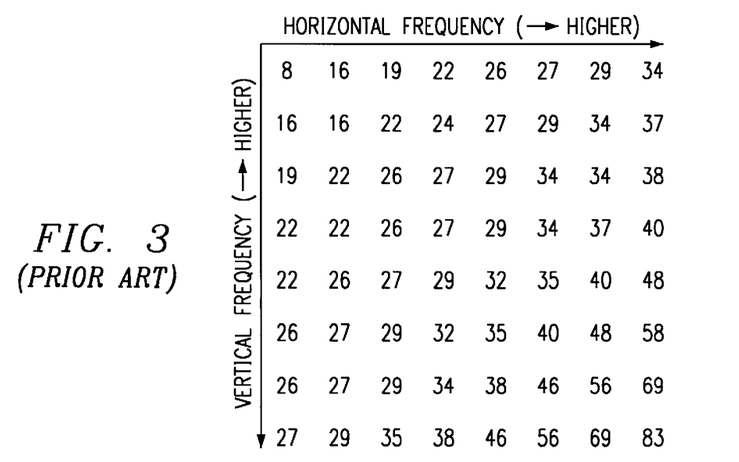
FIG. 3 is a diagram illustrating the default quantization matrix.

Handling of the DC coefficient is different from that mentioned previously. That is, eyes are very sensitive to the large-area brightness error. Consequently, the precision of coding of the DC value is fixed. FIG. 3 is a diagram illustrating the default quantization matrix with respect to the interior of the macro block prescribed in MPEG.

Figure 4:
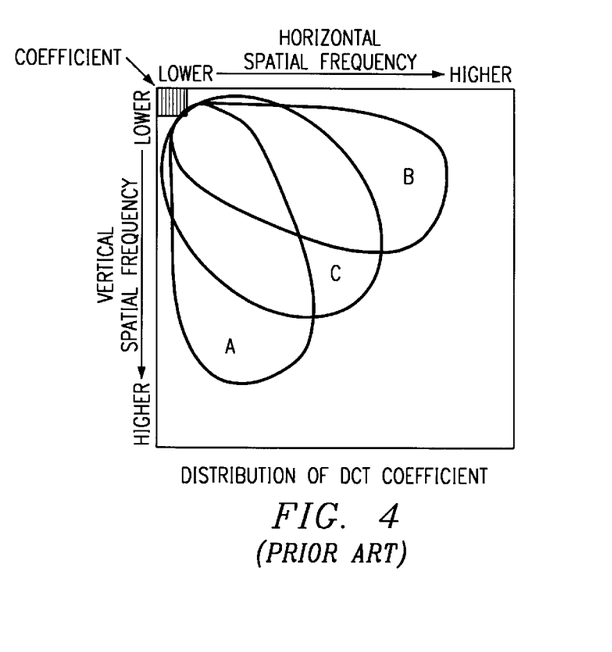
FIG. 4 is a diagram illustrating the relationship between the edge direction and the DCT coefficient.

The direction of the edge has a high correlation with the corresponding DCT coefficient. That is, the DCT coefficient has a useful property in that it appears in the direction perpendicular to the direction of the edge. It is well known that when there exists a block:of image having a vertical edge, the corresponding DCT coefficient having relatively large magnitude appears in the horizontal direction. This is shown in FIG. 4. Please pay attention to the fact that the case discussed here corresponds to type b in this diagram. This correlation property can be used in the zonal coding. FIG. 4 is a diagram illustrating the relationship between the edge direction and the DCT coefficient. In (1), edge types a, b and c correspond to zones A, B and C in (2), respectively. When the shape of zones A, B and C are defined, if an appropriate block type can be obtained for each block, it is possible to reduce the bits for transmission of the coefficient. This is because, when the area concerned is reduced to the zone, the entropy pertaining to the position decreases.

The variable-length coding (VLC) performed in block 3 is a statistical coding method in which a code word is allotted to the value to be coded. A shorter code word is allotted to the value with a higher frequency of generation, while a longer code word is allotted to the value with a lower frequency of generation. On average, the frequency is usually dominated by the shorter code words, and the code string can be shorter than that of the original data. Consequently, it is possible to shorten the sum of the code word lengths. As listed in Table I, the VLC data with respect to DCT coefficient used in MPEG and H. 261 is constructed by the AC run-level symbol.

TABLE I

| Variable-length code | Run | Level |
| --- | --- | --- |
| '10' | End of block | |
| '11s' | 0 | 1 |
| '011s' | 1 | 1 |
| '0100s' | 0 | 2 |
| '0101s' | 2 | 1 |
| : | : | : |
| '0000 0000 0001 1100s' | 30 | 1 |
| '0000 0000 0001 1011s' | 31 | 1 |

Note: The last bit "S" indicates the sign of the level, with "0" corresponding to positive, and "1" corresponding to negative.

Figure 5:
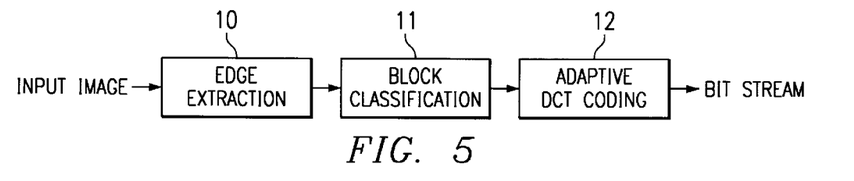
FIG. 5 is a block diagram illustrating the algorithm of this invention.

FIG. 5 is a diagram illustrating the concept of the algorithm of this invention. This is characterized by the fact that it consists of a novel idea that the block classification process is executed uniquely by using the edge information. Usually, in the conventional adaptive DCT coding, classification of blocks is performed in the initial path, and the practical coding is carried out in the later second path. On the other hand, in the scheme proposed here, the edges in the overall image are extracted at first, and the various blocks are then coded.

As mentioned previously, there is a correlation between the edge direction and the corresponding DCT coefficient distribution. Consequently, by using this property, it is possible to determine a group of appropriate scanning order which ensures that the scanning path up to the last coefficient coded in the block is the shortest. In other words, the sum run up to the last coefficient transmitted in the block can be reduced by changing the scanning order to the adaptive type for each block. Consequently, the adaptive scanning scheme does not affect the image quality, while the sum of length of the code words can be reduced with respect to the transformation coefficient. This is because the coefficient after the inverse scanning operation in the decoder has to be totally identical to the nonadaptive-type coding.

In MPEG-2, the other scanning order has been determined, and, based on its syntax, the scanning order can be switched between the zigzag scanning order and the other scanning order. The adaption is performed for each frame. However, in this application example, it is performed for each block.

The population of the nonedge (free of edge) blocks is in average in the range of about 20–80%, depending on the contents of the image. This may not be favorable for the adaptive scanning. When a coding gain of 10% is obtained for the blocks with edge (edge blocks), the lowest overall coding gain is 2%. For the nonedge blocks, the energy compression in the DCT region is larger than the edge block. Consequently, the nonedge blocks are unified to the 16×16-pixel blocks. Then, the 16×16-pixel nonedge blocks are transformed by the 16×16 DCT. Then, the DCT coefficients are scanned in the zigzag form from the DC coefficient to the 64th coefficient. In this way, it is possible to make use of the same VLC table as the 8×8 DCT. The quantization matrix for 16×16 block is prepared in the same way as for 8×8 block. In this way, the additional bits for transmitting the edge blocks can be used. However, there is little deterioration in the quality carried into the nonedge blocks.

Figure 6:
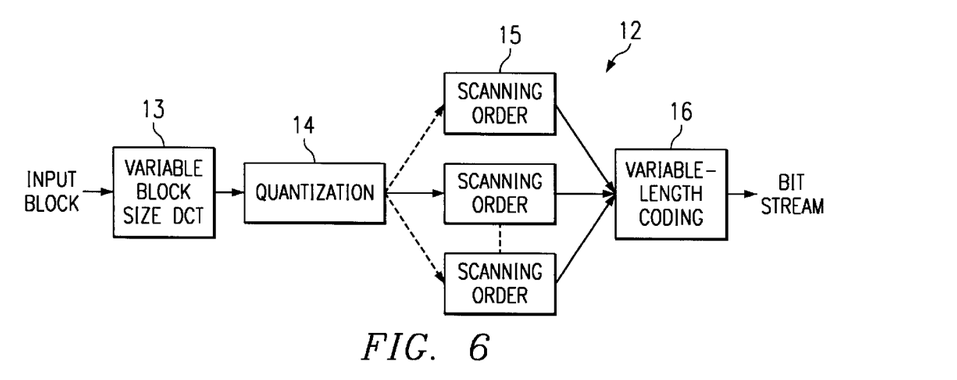
FIG. 6 is a block diagram illustrating an application example of DCT coding in this invention.

FIG. 6 is a detailed block diagram illustrating an application example of the adaptive DCT coding (block (12) in FIG. 5) of this invention.

1. Extraction of the Edge

The edge on the input image is extracted using the linear approximate method (block (10) in FIG. 5). This scheme is called hierarchical edge detection. In order to reduce the overhead, extraction of the edge for the decimated image is applied. This has the advantage of reduction of the memory space for block classification in addition to the complexity of the edge data and calculation. As a result, the site of the edge has to be determined precisely so as to ensure that the classification of the blocks is appropriate for the principal coding process, that is, the adaptive DCT coding. Consequently, images with ¼ size (½ in both the horizontal direction and vertical direction) are used. As a result there is certain change in the classification of the blocks, there is little deterioration in the overall coding performance due to the difference. The decimating filter used relies on selection of the coder. This is because the filter does not influence the later process much, that is, extraction of the edge. The edge extraction process will be explained in detail later.

2. Block Classification (Block 11 of FIG. 5)

Figures 7A, 7B:
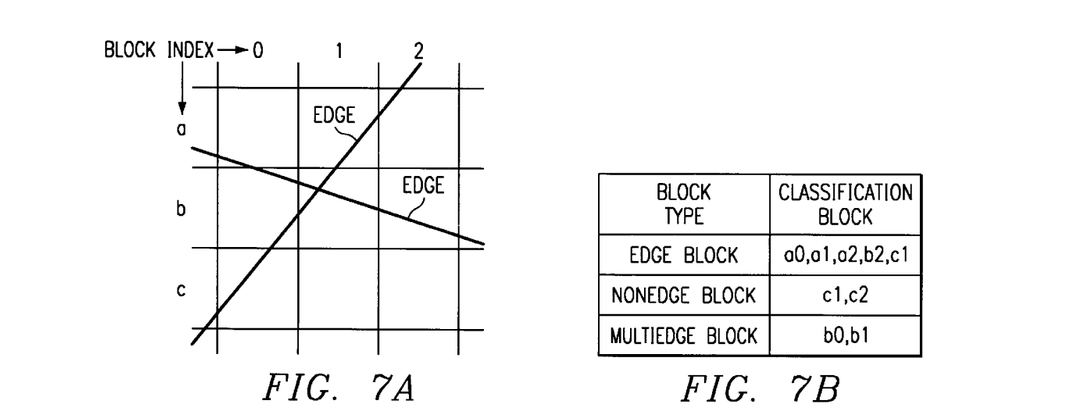
FIG. 7 is a diagram illustrating an example of the block classification.

In this stage, the blocks are classified to one of K classes [$C_k$, k=0, . . . K−1]. Here, the various classes are related to the scanning order. The edge data basically comprise coordinates of the start point, direction, and length. Consequently, the reproduced edge shows the geometric characteristics of the edge. FIG. 7 is a diagram illustrating an example of the block classification. Classification is made to blocks having two edges (multiedge blocks) b0, b1; blocks having one edge (edge blocks) a0, a1, a2, b2, and c0; and blocks free of edge (nonedge blocks) c1 and c2.

Figure 8:
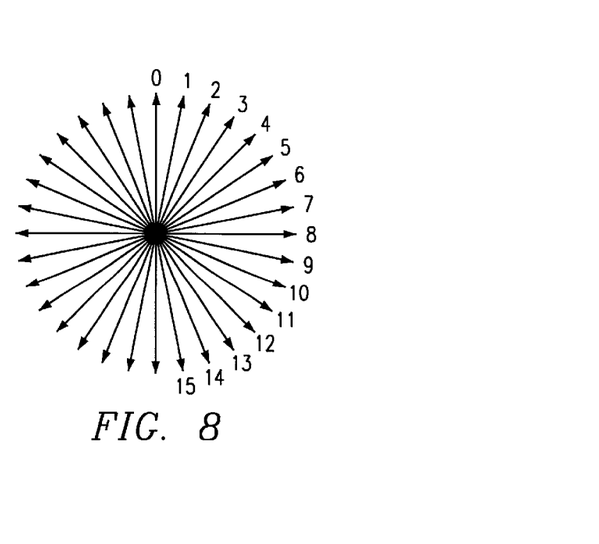
FIG. 8 is a diagram illustrating the quantization of various edges in 16 directions.

As shown in FIG. 8, the various edges are quantized to 16 directions. Consequently, the various blocks are classified into as many as 18 classes. That is, with K=18, it comprises 16 edge blocks, one multiedge block, and one nonedge block. The multiedge block refers to a block having two or more edges, and the nonedge block refers to a block free of any edge. When a ¼-size image is used in extraction of edge, 4×4 blocks are checked in place of 8×8 blocks.

Figure 9:
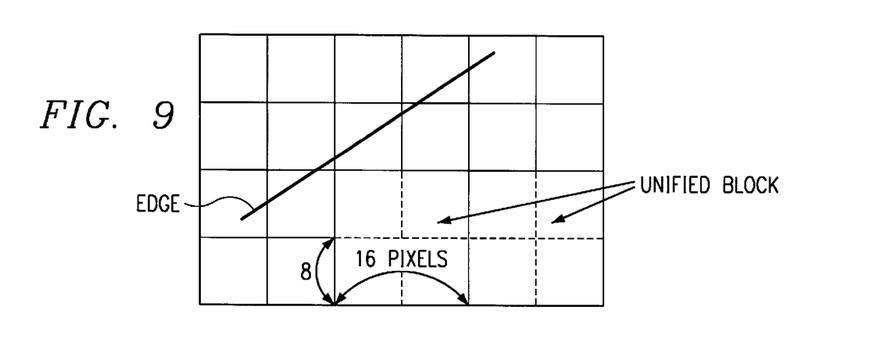
FIG. 9 is a diagram illustrating the unification of the nonedge blocks.

As mentioned previously, the nonedge block is unified to a 16×16-pixel block, as shown in FIG. 9. As can be seen from FIG. 9, certain nonedge blocks left as 8×8 [blocks] are taken individually with respect to the 16×16 nonedge blocks.

3. Adaptive Scanning (Block 12 in FIG. 5 and Blocks in FIG. 6)

Figure 10:
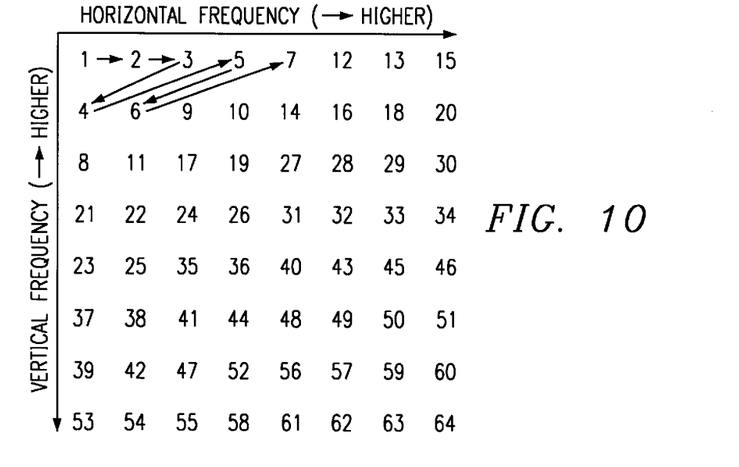
FIG. 10 is a diagram illustrating the scanning order $S_0$ used in the simulation.
Figure 11:
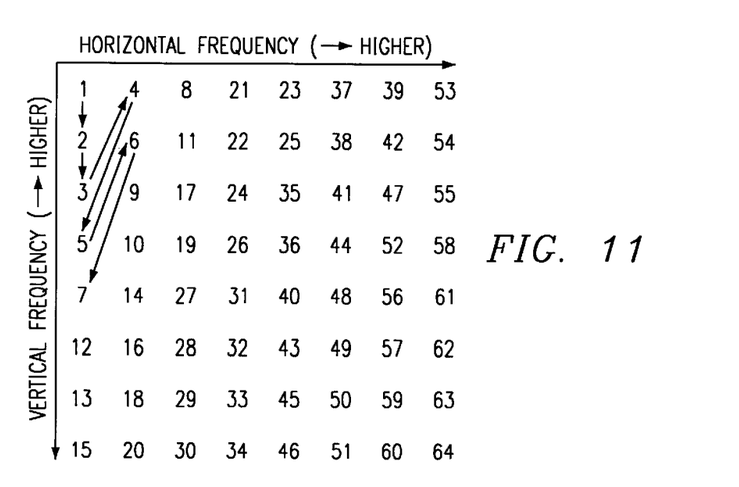
FIG. 11 is a diagram illustrating scanning order $S_4$ used in the simulation.

After the block classification is performed, the various blocks are coded in the scanning order related to the classes (block 12 in FIG. 5). In detail, first of all, processing of the variable block size DCT is performed with respect to the input block (block 13 in FIG. 6). The variable block size DCT can be realized with the value of M in formula (1) taken as the block size (for example, M=16 for the 16×16 block DCT). The classification of the block size is performed based on presence/absence of the edge. If there exists an edge in the 16×16 block, it is divided to four blocks, and is subjected to 8×8-block DCT processing. If there exists no edge, processing is performed as 16×16-block DCT. Then, quantization is carried out (block 4). As a result this operation is basically identical to the operation of quantization (block 2) explained in FIG. 1; in this application example, the quantization matrix shown in FIG. 3 is nevertheless used independent of the class of the block. The classes in an appropriate number must have a form related to the distribution of the block DCT coefficients. Consequently, before coding of the image sequence, a control mechanism with compatibility that defines several groups of scanning order is adopted. Then, for each frame, the optimum scanning order is selected with respect to the various classes in the frame (block 15 in FIG. 6). In the simulation, five groups of scanning orders $S_i$, i=0, 1 . . . , S−1 (S=5) are determined. $S_0$ and $S_4$ are as shown in FIGS. 10 and 11. $S_2$ is identical to the zigzag-type scanning as in FIG. 2. $S_1$ is in the middle between $S_0$ and $S_2$. Also, $S_3$ is in the middle between $S_4$ and $S_2$. Then, the variable-length coding is performed (block 16). This operation is identical to that of VLC illustrated by FIG. 1 (block 3).

Figure 12:
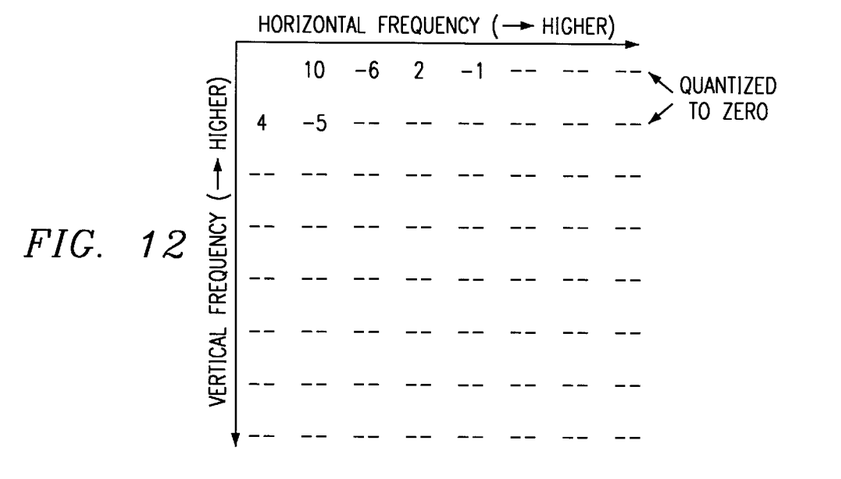
FIG. 12 is a diagram illustrating an example of the DCT AC coefficient.

In the following, how the adaptive scanning method works will be explained. Suppose there exists a vertical edge in the block, the DCT AC coefficient corresponding to what should be transmitted becomes the pattern shown in FIG. 12. It is predicted that the block is classified as related to $S_0$, and it is actually assumed so. In this case, the zigzag scanning order and the code words corresponding to the DCT coefficients using $S_0$ are listed in Table II. In this application example, VLC and quantization specified by MPEG-1 are used. In this way, it is possible to reduce 8 bits when the DCT coefficient is coded.

TABLE II

| Zigzag scanning | | | $S_0$ scanning | | |
|---|---|---|---|---|---|
| DCT coefficient | (run, level) | Code length [bit] | DCT coefficient | (run, level) | Code length [bit] |
| 10 | (0, 10) | 13 | 10 | (0, 10) | 13 |
| 4 | (0, 4) | 8 | −6 | (0, −6) | 9 |
| −5 | (1, −5) | 13 | 4 | (0, 4) | 8 |
| −6 | (0, −6) | 9 | 2 | (0, 2) | 5 |
| 2 | (0, 2) | 5 | −5 | (0, −5) | 9 |
| −1 | (7, −1) | 7 | −1 | (0, −1) | 3 |
| Sum bits | | 55 | Sum bits | | 47 |

In coding of the image sequence, it is necessary to have a control routine for deriving the optimum scanning for the various classes. Consequently, the coder has to count generation of the DCT coefficients sent by the various coordinates to each class. However, as the zigzag scanning is usually performed, there is no need to count the coefficients with respect to the 16×16 nonedge block. After processing of the image, s and k are taken as representing the scanning order and classes, and the judgment standard σ(s, k) is calculated as follows.
[Formula 3]

$$\delta(s, k) = \sum_{i=0}^{7} \sum_{j=0}^{7} \text{path}[s][i][j] \times \text{cnt}[k][i][j] \quad (3)$$

where, s=0, 1 . . . S−1, and k=0, 1 . . . K; path [s] [i] [j] represents the order in (i, j) of scanning s; and cnt [k] [i] [j] represents the number of the coefficient in (i, j) of class k.

Then, the aforementioned judgment standard is used to make the final judgment.
[Formula 4]

$$\text{scan\_order}[k] = \arg \min_{s} \delta(s, k) \quad (4)$$

Consequently, K log$_2$S bits used in displaying which scanning order is used for the various classes have to be transmitted before coding of the image. In the simulation, the judgment made for an image was also used in the next image, and the initial state of the scanning order is set as follows.
[Formula 5]

$$\text{scan}_{13} \text{ order } [\;]=\{0,1,1,2,2,2,3,3,4,3,3,2,2,2,1,1,2,2\} \quad (5)$$

[Extraction of Edge]

Figure 13:
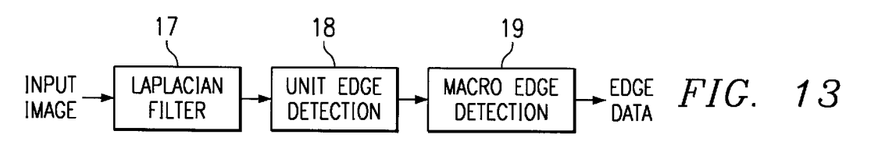
FIG. 13 is a block diagram illustrating an application example of the edge extraction process in this invention.

FIG. 13 can be used to explain in detail the edge extraction (block 10 in FIG. 5).

FIG. 13 is a block diagram illustrating the edge extraction. The various portions in this process may be explained as follows.

1. Detection of Unit Edge (block 18)

Figure 14:
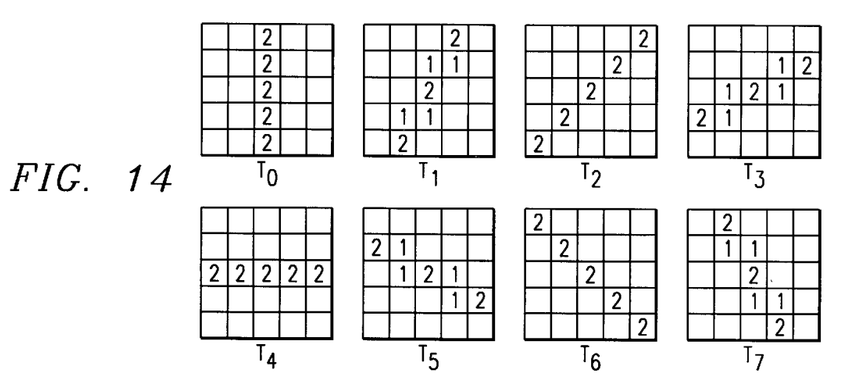
FIG. 14 is a diagram illustrating the 8-direction segment pattern in unit edge detection.

In order to find out the site of the edge, first of all, the well-known Laplace operator is made to adapt to the input image (block 17). Then, the site with a large variation in the intensity, that is, the binary image that represents the edge, is derived by the threshold function using $\mu$+K·σ using the threshold function. Here, $\mu$, σ, and K represent the average, the standard deviation in the differential space, and the coefficient, respectively. FIG. 14 is a diagram illustrating an example of the segment pattern with small segments in 8 directions. They are represented as template Tn with n=0, 1 . . . 7. The inlets at (j, k) are represented by $t_n$(j, n).

Λ (x, y) is represented by λ (x+j, y+k), with j, k=0, 1, 2, 3, and 4, and it is the partial region inside the binary image made of 5×5-pixel region. The intercorrelation Rn(x, y) between template Tn and Λ (x, y) is calculated by the following formula.
[Formula 6]

$$R_n(x, y) = \sum_{j} \sum_{k} \lambda(j, k) t_n(j-x, k-y) \quad (6)$$

Then, if there is n for $R_n$ (x, y) to be equal to or larger than 8, the flag at coordinates (x, y) on the n-bit plane is set high. Here, n is changed from 0 to 7. This indicates that at coordinates (x, y), template $t_n$ is detected as matching pattern. This process has to be applied on the entirety of the binary image. In this way, the unit edge is obtained.

2. Detection of Macro Edge (block 19)

Figure 15:
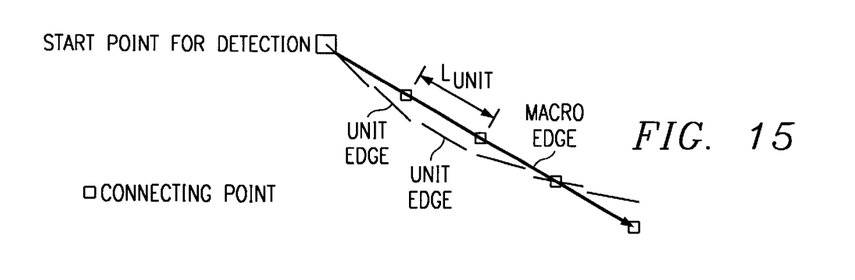
FIG. 15 is a diagram illustrating the macro edge detection.

After the unit edges are extracted, as shown in FIG. 15, detection of the macro edge is detected. The unit edges are connected to form a macro edge. This macro edge is determined in the direction of 16, with a distance of 11.25°. The start point of detection can be determined as the pixel on which the flag of the bit plane among eight of them acts. This point is derived by the raster scanning formula, and it can restrict the searching zone connected to the lower side of the start point.

Suppose the start point on which the flag in the n-bit plane acts is determined, direction N of the detection process is determined by N=2n, and the searching operation after that is applied. As there is certain risk in predetermining the direction of the macro edge before the searching operation, the direction believed to be the most considered among the three directions considered, that is, N, N−1 and N+1, is selected. In the various directions under consideration, judgment is made on whether the macro edge is connected at the various connecting points for each unit length $L_{unit}$ along each direction (see FIG. 15). When the flag on the bit plane of n, (N−1)/2, or (N+1)/2 is acted by the connecting point or its vicinity, that is, the 8 adjacent pixels, the macro edge is extended to the connecting point. Among the three candidates of macro edges obtained in this way, the longest one has the right to become the coded macro edge. Once the macro edge is detected, in order to avoid extraction of the same macro edge, it is preferred that a postprocessing be adopted. The series of pixels corresponding to the macro edge extracted on certain bit plane of n, (N−1)/2, or (N+1)/2 and the adjacent 8 pixels are taken as neutral. This plays the role of attenuation of the macro edge, and it helps significantly in reducing the number of the macro edge extracted in the image.

3. Coding of Edge Data

Table III lists the message coded for the macro edge. The message pertaining to the start point can be further compressed by using appropriate coding scheme.

TABLE III

| Message to be coded | Range | Bit number |
|---|---|---|
| start point | Picture size | Log$_2$ (horizontal size) + Log$_2$ (vertical size) |
| Edge detection | [0, 15] | 4 |
| Edge length | [1, 16] | Variable-length code |

Based on the block classification pertaining to this invention, preparatory equipment was performed for clarifying the distribution of the DCT coefficients transmitted for the various classes.

As the standard model, MPEG-1 I image coding was used. In order to ensure impartial comparison, the simulation experiment was performed repeatedly, and the sum number of the bits was selected as near that of the standard model, that is, MPEG-1, as possible. Table IV lists the statistical results obtained in the experiment.

TABLE IV

| Name of sequence | Coding algorithm | PSNR [dB] | | | Average bits/frame (edge data) |
|---|---|---|---|---|---|
| | | Y | Cb | Cr | |
| Susie | MPEG-1 | 31.77 | 42.11 | 41.43 | 25,537 |
| | Proposed | 31.87 | 42.18 | 41.51 | 22,152 (467) |
| Table Tennis | MPEG-1 | 26.05 | 37.63 | 35.53 | 27,125 |
| | Proposed | 26.01 | 37.95 | 36.06 | 24,528 (315) |
| Mother & Daughter | MPEG-1 | 32.87 | 39.31 | 40.64 | 25,059 |
| | Proposed | 32.96 | 39.38 | 40.61 | 23,328 (816) |

Note Average bits/frame includes the edge data

According to this invention, it has been found that the algorithm can significantly reduce the bits for block classification. The data speed with respect to the geometric edge display listed in the table is always 320×log$_2$ 5. Here, 1,320 corresponds to the number of 8×8 blocks inside the image with a size of 352×240, and log$_2$ is needed for indicating the scanning order among the five candidates with respect to the each block.

This result indicates that this algorithm can reduce the bits by about 8%, and the performance is generally better than that of the standard model.

In the above, explanation has been made with respect to the application example. However, this invention is not limited to this application example.

For the video signal, high-efficiency good compressed coding can be realized.

What is claimed is:

1. A method of coding individual frames in a video signal comprising the steps of:

performing an edge extraction upon the entire frame;

coding any extracted edges by starting coordinate, one of a predetermined plurality of directions and length;

dividing the frame into a plurality of blocks;

classifying each of said plurality of blocks into one of a plurality of categories, the plurality of categories including a first category of blocks including no extracted edges, a plurality of second categories of blocks having one extracted edge and a corresponding one of said predetermined plurality of directions and a third category of blocks including more than one extracted edge;

converting each block from spatial domain pixels into the DCT coefficients via a Discrete Cosine Transform (DCT);

providing a plurality of DCT coefficient scanning orders including a default zig-zag scanning order and a plurality of directional scanning orders, each directional scanning order corresponding to one of said predetermined plurality of directions and having an order corresponding to an expected distribution of DCT coefficients for said corresponding direction; and variable length coding said DCT coefficients of each block employing a corresponding one of said DCT coefficient scanning orders, whereby blocks classified in said first and said third categories are scanned with said default zig-zag scanning order and blocks classified in one of said second categories are scanned with a directional scanning order for said corresponding direction.

2. The method of coding individual frames in a video signal of claim 1, wherein:

said predetermined plurality of directions of said classifying step is 16.

3. The method of coding individual frames in a video signal of claim 1, wherein:

said step of performing an edge extraction upon the entire frame includes
forming a decimated frame smaller than the frame, and
performing edge extraction upon said decimated frame.

4. The method of coding individual frames in a video signal of claim 3, wherein:

said step of forming a decimated frame decimates the frame by one half in the horizontal direction and by one half in the vertical direction.

5. A method of coding individual frames in a video signal comprising the steps of:

performing an edge extraction upon the entire frame;

following said step of performing edge extraction coding any extracted edges by starting coordinate, one of a predetermined plurality of directions and length;

dividing the frame into a plurality of blocks;

classifying each of said plurality of blocks into blocks including no extracted edges and blocks having at least one extracted edge;

converting each block including no extracted edges from spatial domain pixels into the DCT coefficients via a Discrete Cosine Transform (DCT);

dividing each block having at least one extracted edge into a plurality of subblocks;

converting each subblock from spatial domain pixels into the DCT coefficients via a Discrete Cosine Transform (DCT);

providing a plurality of DCT coefficient scanning orders including a default zig-zag scanning order and a plurality of directional scanning orders, each directional scanning order corresponding to one of said predetermined plurality of directions and having an order corresponding to an expected distribution of DCT coefficients for said corresponding direction;

classifying each of said plurality of subblocks into one of a plurality of categories, the plurality of categories including a first category of subblocks including no extracted edges, a plurality of second categories of subblocks having one extracted edge and a corresponding one of said predetermined plurality of directions and a third category of subblocks including more than one extracted edge;

variable length coding said DCT coefficients of each block and each subblock, said step of variable length coding said DCT coefficients of each block and each subblock
employs said default zig-zag scanning order for blocks having no extracted edges,
employs said default zig-zag scanning order for subblocks classified in said first and said third categories, and
employs a directional scanning order for subblocks classified in one of said second categories according to said corresponding direction.

6. The method of coding individual frames in a video signal of claim 5, wherein:

each block consists of 16 by 16 pixels; and
each subblock consists of 8 by 8 pixels.

7. The method of coding individual frames in a video signal of claim 5, wherein:

said predetermined plurality of directions of said classifying step is 16.

8. The method of coding individual frames in a video signal of claim 5, wherein:

said step of performing an edge extraction upon the entire frame includes
forming a decimated frame smaller than the frame, and
performing edge extraction upon said decimated frame.

9. The method of coding individual frames in a video signal of claim 5, wherein:

said step of forming a decimated frame decimates the frame by one half in the horizontal direction and by one half in the vertical direction.

* * * * *